Feb. 20, 1934.  B. T. WILLISTON  1,947,959
UNIVERSAL JOINT
Filed March 27, 1931
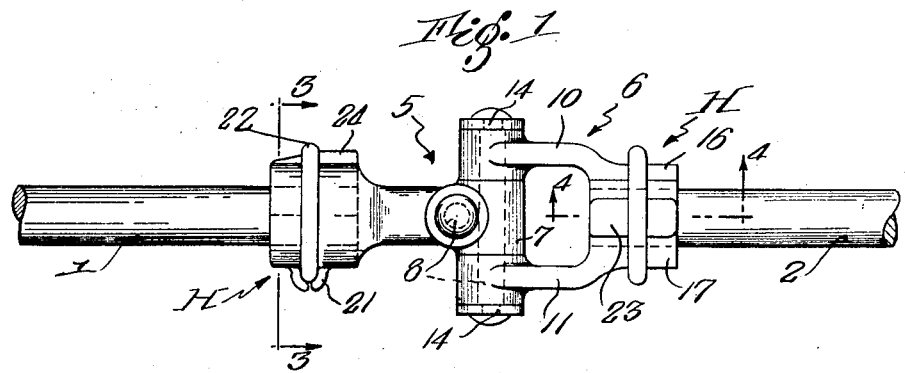
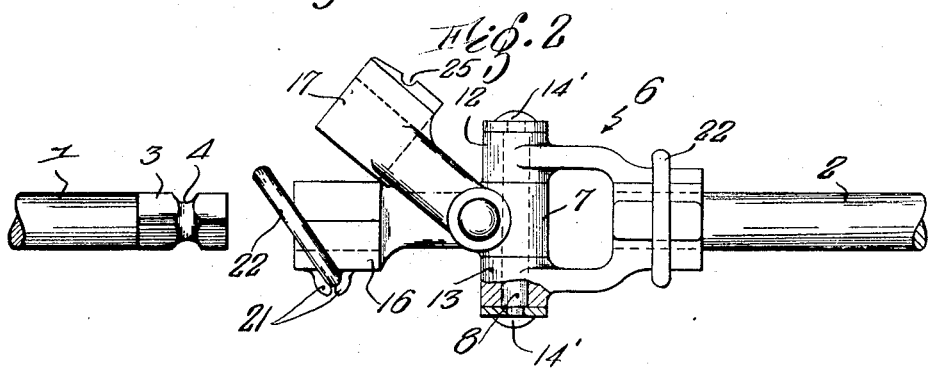
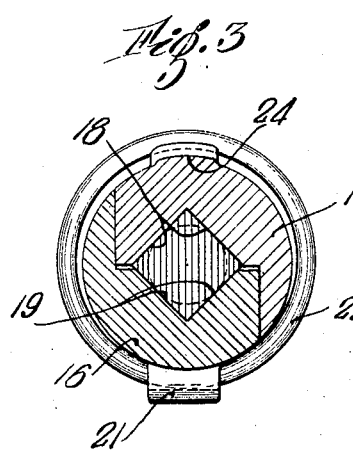
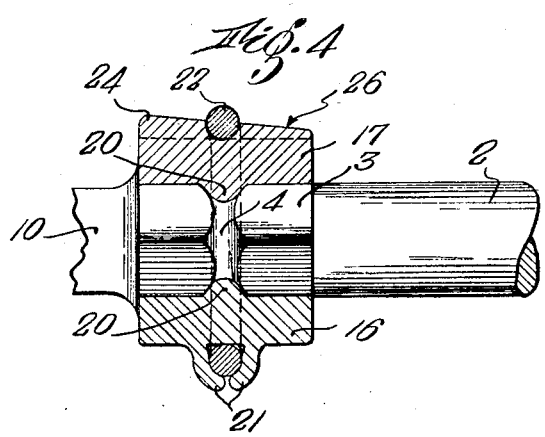
Inventor
Belvin T. Williston
by Roberts, Cushman & Woodbury
his Attorneys Patented Feb. 20, 1934

1,947,959

UNITED STATES PATENT OFFICE 1,947,959

UNIVERSAL JOINT

Belvin T. Williston, Somerville, Mass., assignor to Consolidated Ashcroft Hancock Company, New York, N. Y., a corporation of Delaware Application March 27, 1931. Serial No. 525,633

6 Claims. (Cl. 64—102)

This invention pertains to universal joints of the general type commonly known as Hook's joints, such as disclosed for example in the patent to Williston No. 1,121,962, dated December 22, 1914, and relates more particularly to improved means for attaching the yoke members composing the joint to their respective shafts, torsion rods, or the like. Commonly the yoke members comprise hub portions which are secured to their rods or shafts by means of bolts, cotter-pins, or the like, but since joints of this type are used extensively in locomotive service and under other conditions where they are continually subjected to repeated shocks and vibrations, such means of connection as those just described tend to loosen, so that the pins or bolts eventually drop out and may be lost before the defective condition is discovered. This is particularly objectionable in locomotive service, since occurrences of this kind may cause long delays by reason of the fact that the materials for making repairs are not always conveniently available.

Among the objects of the present invention are to provide yoke securing means of a type better adapted to withstand shocks and vibrations than the devices at present in use; to provide a joint including such improved securing means and which at the same time is simple, strong and durable; to provide yoke securing means which is readily releasable to facilitate removal of the yoke from the shaft or its attachment thereto, and whose constituent parts are all so united as to preclude possibility of loss; and in general to provide improved apparatus of this class adapted to perform its intended function in an acceptable and reliable way.

In the drawing:

Fig. 1 is a side elevation of a universal joint;

Fig. 2 is a view of the device illustrated in Fig. 1 showing a shaft end section disconnected therefrom;

Fig. 3 is a section along the line 3—3 of Fig. 1; and

Fig. 4 is a section along line 4—4 of Fig. 1.

Referring to the drawing, the numerals 1 and 2 indicate portions of two shafts, torsion rods, or the like, which are connected by the universal joint forming the subject of the present invention so that torque or turning force may be transmitted from one shaft to the other even when the shafts are disposed at an angle to each other. Preferably each shaft or rod end 3, as illustrated in Fig. 2, is of polygonal section, for example square, and has a circumferential groove 4 or equivalent notches or recesses for a purpose hereinafter described.

The improved universal joint herein illustrated comprises a spider 7 having means defining two axes at right angles to each other; for example, as herein shown, the spider may have a pair of bearings at right angles to each other adapted to receive shafts 8 which are thus likewise disposed at right angles to each other, it being understood that other and equivalent arrangements may be employed. These shafts 8 project beyond their bearings at opposite ends and provide pivotal supports for yoke members 5 and 6 respectively, said yoke members being of like construction. Each yoke preferably has spaced arms 10 and 11 having bearing portions 12 and 13 respectively provided with journal openings for the ends of one of the shafts 8, the arms 10 and 11 thus being capable of turning independently relatively to the spider 7. The ends of each shaft 8 preferably are shouldered, and in assembling the parts the bearing bosses 12 and 13 are first slid over the shaft 8, then washers 14 are seated on the shoulders of the shaft, and the ends of the shafts are headed over at 14', thus permanently uniting the parts but permitting the arms 10 and 11 to swing freely.

Each yoke member also comprises a hub H, but unlike universal joints of ordinary type, these hubs in the present instance consist of separable segmental parts 16 and 17 forming the free extremities of the swinging arms 10 and 11 respectively. Preferably, though not necessarily, the complemental parts 16 and 17, when assembled, provide a hub having an external surface of substantially circular contour. The opposed faces of the parts 16 and 17 comprise surfaces 18 and 19 collectively constituting opposed relatively movable walls of a socket for the reception of the end portion of one of the shafts or rods 1 or 2. As shown, the surfaces 18 and 19 define a polygonal socket in which the end of the shaft or rod is normally snugly seated so that rotational movement of the shaft is accurately and reliably transmitted to or from the yoke member to which it is attached. To prevent endwise movement of the shaft or rod in its socket, the socket wall of one or both of the parts 16 or 17 may be provided with a rib 20 either integral with the parts 16 or 17 from which it projects or, if desired, consisting of an inserted part, for example, a pin of steel or other hard material, cast or otherwise fixed in the parts 16 or 17 and extending transversely across a portion of the socket opening. These ribs or pins 20 are so designed as to fit within the recess 4 in the shaft or rod end so that the shaft can not be moved endwise relatively to the yoke.

In order to retain the parts 16 and 17 in assembled relation about the shaft or rod end, suitable clamping means is provided which forms a permanent part of the yoke structure, such that it can not be lost or misplaced. Thus, for example, the member 16 is here shown as provided with integral lugs 21 which collectively constitute a bearing boss for a ring-like clamping member 22. This member 22 is of heavy wire or the like, preferably stiffly resilient, and which is strong enough when embracing the hub of the yoke to prevent separation of the parts 16 and 17, even under the maximum turning torque to which the parts may be subjected. The lugs 21 preferably are formed as integral projections from the member 16, their free ends normally being separated, but in assembling the ring with the part 16, the ring is disposed between the ends of the lug 21 and the latter are then hammered down so that their ends substantially engage, thus preventing removal of the ring. If desired, the ends of the lugs 21 may be soldered or welded together.

In assembling the shaft or rod 1, for example, with the improved universal joint described, the parts are first arranged substantially as shown at the left-hand side of Fig. 2. The end of the shaft or rod 1 is then passed through the ring 22 and is disposed in the lower half of the socket as defined by the part 16. The part 17 is then swung down into cooperative relation to the part 16 and the ring 22 is swung up and over the part 17 so as to embrace the parts 16 and 17. To prevent accidental displacement of the ring I prefer to provide latching means, here shown as consisting of a fin or elongate boss 24 on the part 17, such fin having a transverse notch 25 which is adapted to receive the ring and retain the latter in clamping position. For best results the ring is very strong and stiffly resilient and preferably of such size that it can only be seated in the notch 25 by the application of considerable force, for example by hammer blows, the fin 24 having an inclined surface 26 to facilitate entrance of the ring in the notch 25. When the ring has thus been sprung into the notch, it is substantially impossible to dislodge it except by intentional application of substantial and properly applied force so that all danger of separation of the parts by vibration or the like is eliminated.

While the permanently attached ring above described forms a desirable clamping means, I contemplate that other and equivalent clamping means forming a permanent part of the yoke element may be employed within the purview of my invention. It is to be noted that either of the shafts 1 or 2 may be connected with or disconnected from the joint structure independently of the other; and I contemplate that if for any reason it should be desired to make one of the yokes integral with its shaft or rod, the other may be made as hereinabove described in accordance with the present invention. I further contemplate that the yoke sructure may be of any desired shape or contour and that changes in size and relative arrangement of parts as well as reversals and substitutions of equivalents may be made within the scope of the invention.

When in the above description and in the annexed claims, I refer to parts as "permanently" or "irremovably" connected or united I intend thereby to indicate that such parts can only be separated by substantial distortion, breakage or disintegration of the material comprising one or both of such parts and to distinguish from connections employing screw threaded elements, cotter pins, or similar devices commonly used for uniting parts which at times must or may be separated.

I claim:

1. A universal joint comprising a pair of shafts disposed substantially at right angles to each other and a yoke member mounted on each shaft, each yoke member comprising a pair of spaced arms, each arm being integral with one of a pair of complemental separable parts adapted when assembled to form the hub of the yoke member, a stiffly resilient ring adapted to embrace the parts constituting the hub of each yoke releasably to hold said parts in assembled relation, and means permanently securing each of said rings to its respective yoke structure.

2. The combination with shaft end sections, of a yoke comprising a pair of spaced arms, each arm being integral with one of a pair of complemental separable parts adapted when assembled to form the hub of the yoke, said separable parts being adapted to embrace one of the shaft sections, means providing interlocking engagement between these parts and this shaft section, an expansible and contractible substantially annular member mounted to pivot on one of the separable parts and movable to a position substantially to embrace and to bear substantially radially against the other of these parts, the latter part having a retaining notch for releasably holding the annular member in position thereon, and a universal connection between the separable parts and the other shaft section.

3. In an apparatus of the class described, comprising shaft end sections, a yoke comprising a pair of spaced arms, each arm being integral with one of a pair of complemental separable parts adapted when assembled to form the hub of the yoke and to embrace one of the shaft sections, another similar yoke having a hub embracing the other shaft section, and a universal connection between the two yokes, the combination of means providing for interlocking engagement between the separable parts of each yoke and the shaft section associated therewith, and resilient means associated with the separable parts of each yoke for releasably holding the latter in interlocking engagement with the respective shaft sections.

4. A universal joint comprising a spider 7 having bearings for a pair of shafts 8 disposed with their axes substantially at right angles to each other, a yoke member pivotally mounted upon each of said shafts, the opposite ends of each shaft 8 being provided with integral enlargements or heads 14 so as irremovably to unite the yokes to the spider, each yoke having a socket for the reception of the end of a rod 1 or 2, respectively, each yoke member comprising a pair of spaced arms 10, 11, each arm being integral with a part 16 or 17, respectively constituting one wall of the socket, said walls of the socket being relatively movable and separable to admit the end of shaft 1 or 2 respectively, releasable clamping means 22 for holding said movable socket walls normally in shaft engaging position, and means 21 irremovably securing the releasable clamping means to the yoke.

5. A universal joint comprising a spider having bearings for a pair of shafts disposed with their axes substantially at right angles to each other, a yoke member pivotally mounted upon each of said shafts, the opposite ends of each shaft being provided with permanent heads so as irremovably to unite the yokes to the spider, each yoke having a socket for the reception of a rod end, each yoke member comprising a pair of spaced arms, each arm being integral with a part constituting one wall of the socket, said walls of the socket being separable to admit a rod end, one at least of said walls having a projection adapted to engage a recess in the rod to prevent endwise movement of the latter in the socket, and releasable clamping means irremovably united to the yoke for clamping said movable walls in rod retaining position.

6. A universal joint comprising a spider having means defining two axes substantially at right angles to each other, a pair of yokes, means irremovably uniting each yoke to the spider, the yokes being arranged respectively to turn about the respective axes, one at least of said yokes comprising a pair of spaced arms, each arm being integral with one of a pair of complemental separable parts adapted when assembled to form the hub of the yoke member, the opposed surfaces of said parts defining a polygonal socket for the reception of a rod end of substantially similar contour, means to prevent endwise movement of the rod when seated in the socket, a releasable clamping device, and means irremovably uniting said clamping device to the yoke, said clamping device being operative to hold the constituent parts of the hub in assembled relation about the rod end.

BELVIN T. WILLISTON.